United States Patent [19]
Lynch

[11] 3,962,998
[45] June 15, 1976

[54] LIMITED FEEDER FOR FARM ANIMALS

[76] Inventor: Delmar J. Lynch, Burbank, S. Dak. 57010

[22] Filed: Jan. 10, 1975

[21] Appl. No.: 540,133

[52] U.S. Cl. .............................. 119/56 R; 222/485
[51] Int. Cl.² ........................................ A01K 5/00
[58] Field of Search ............. 119/56 R, 52 B, 56 A, 119/53, 51.11–51.15; 222/482–485

[56] References Cited
UNITED STATES PATENTS

| | | | |
|---|---|---|---|
| 807,484 | 12/1905 | Moss | 119/56 R |
| 936,051 | 10/1909 | Slichter | 119/56 R |
| 1,109,009 | 9/1914 | O'Brien | 119/56 R |
| 3,434,459 | 3/1969 | Green | 119/56 R |
| 3,800,746 | 4/1974 | Stidham | 119/56 R |

FOREIGN PATENTS OR APPLICATIONS

| | | | |
|---|---|---|---|
| 935,813 | 9/1963 | United Kingdom | 119/56 R |

*Primary Examiner*—J.N. Eskovitz
*Attorney, Agent, or Firm*—Merchant, Gould, Smith, Edell, Welter & Schmidt

[57] ABSTRACT

An elongated wall structure providing a plurality of feed troughs in a row in side by side relationship for individual feeding of animals from an overlying source of supply of feed, the delivery of feed to the troughs being controlled by measuring devices of predetermined capacity which receive from the source of supply and deliver the predetermined quantities to the feed troughs. An elongated slide includes a plurality of such measuring devices and is reciprocable in a guideway between the source of supply and the feed troughs, the guideway extending longitudinally over the row of feed troughs. The guideway includes a bottom wall having discharge openings through which feed is delivered from the measuring devices to the troughs, the bottom wall engaging only edges of the slide and measuring devices to support the same in the guideway.

5 Claims, 9 Drawing Figures

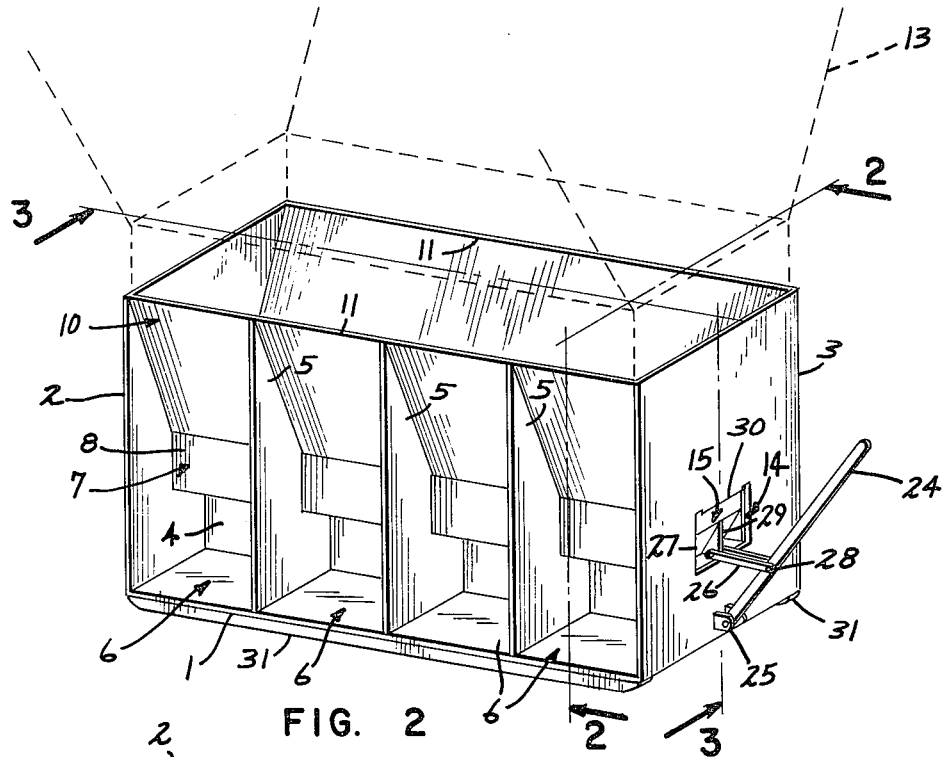
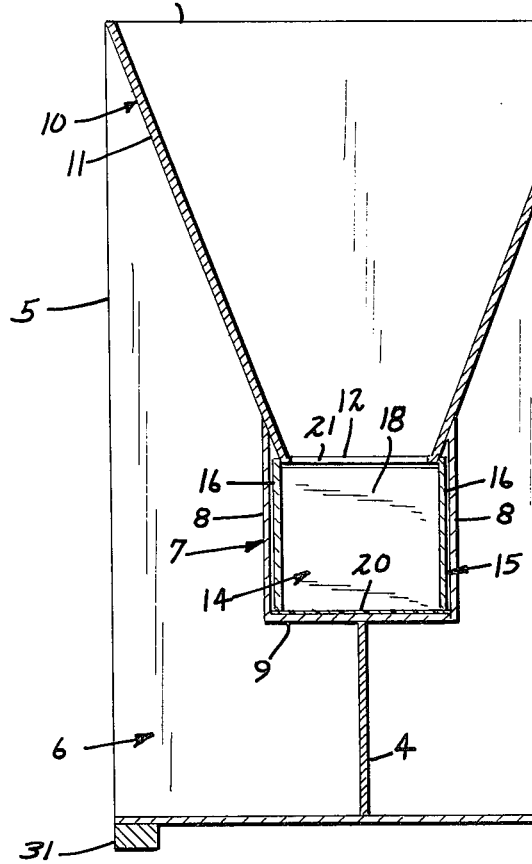
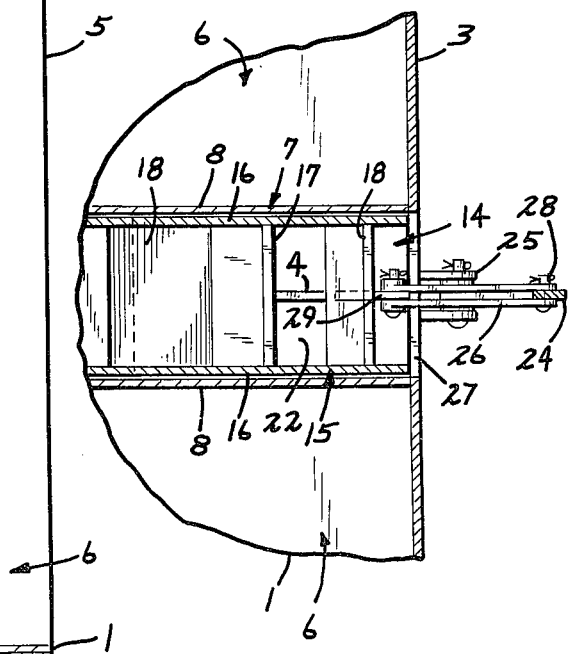

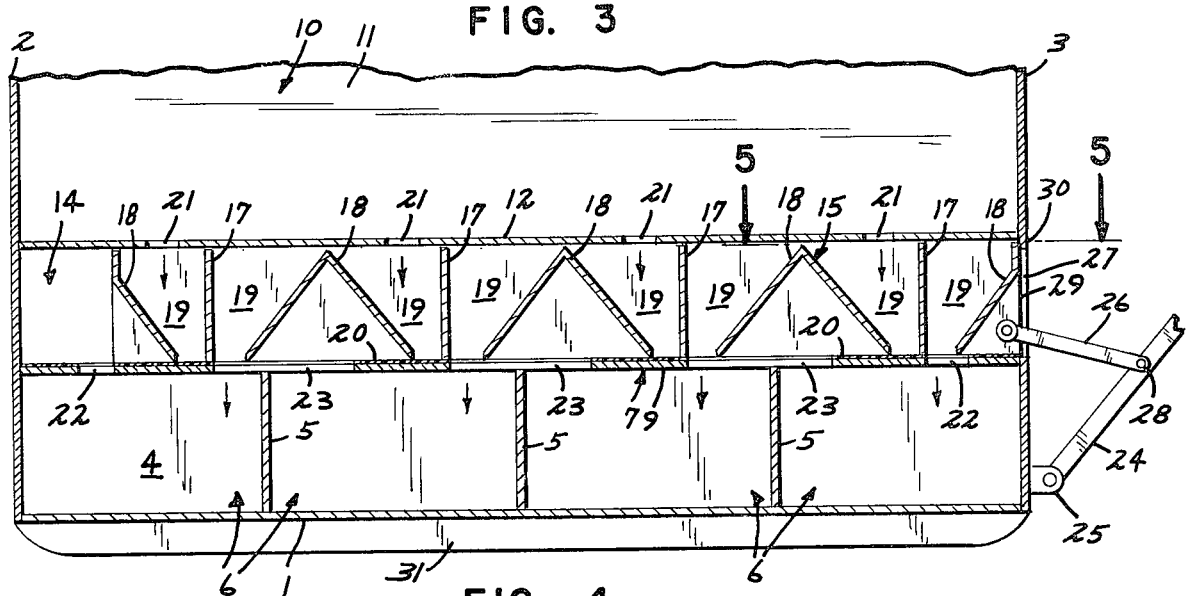
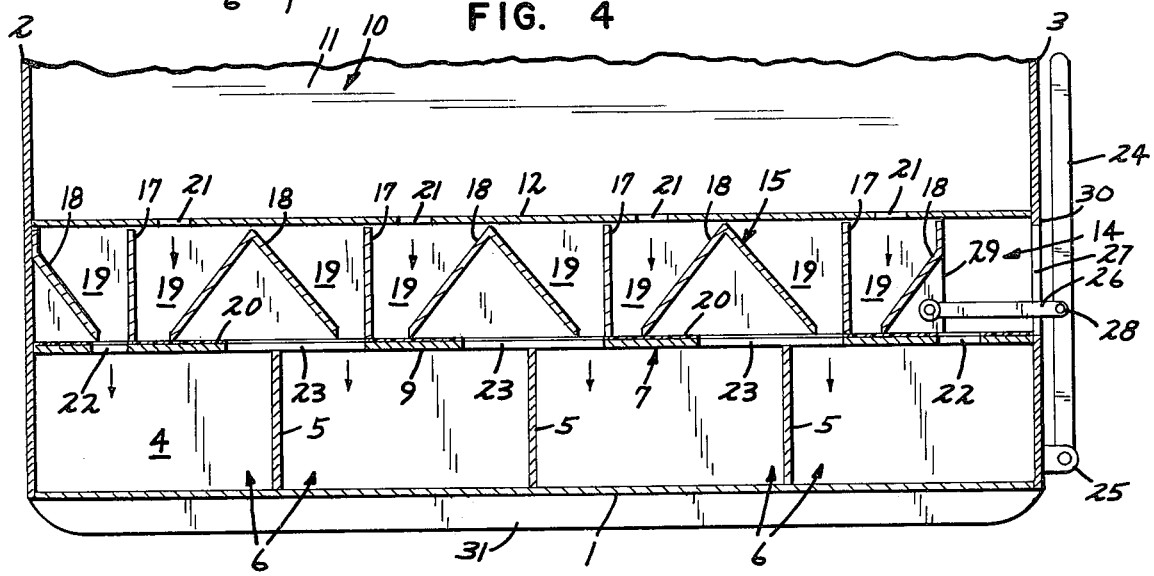
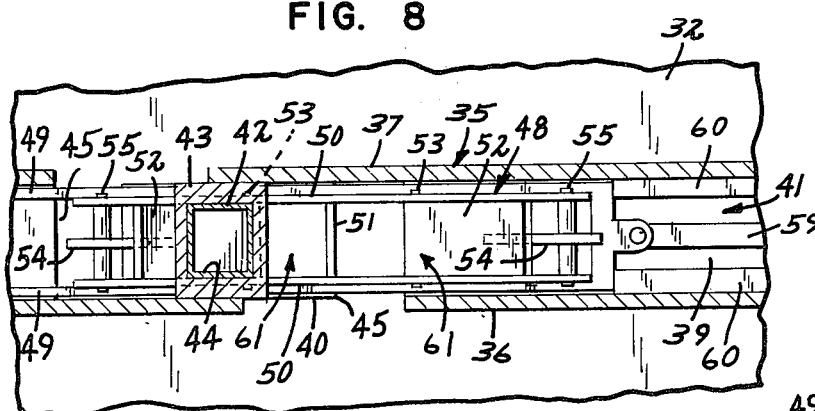
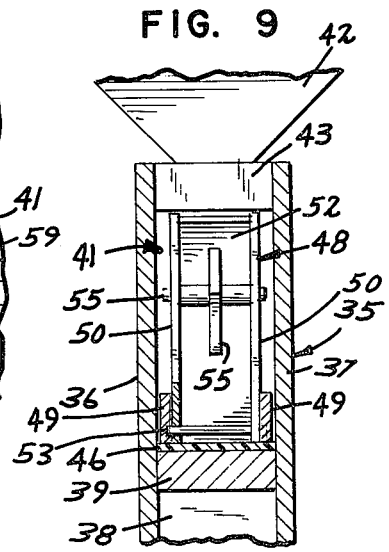

LIMITED FEEDER FOR FARM ANIMALS

BACKGROUND OF THE INVENTION

This invention is in the nature of an improvement in livestock bunker feeders, and is particularly adapted for use in providing acurately measured quantities of feed to animals that are fed individually. It has been found that, by regulating the daily intake of food to such animals as brood sows, the weight of these animals may be acurately controlled and the physical condition of the forthcoming litter substantially improved.

SUMMARY OF THE INVENTION

The present invention involves an elongated wall structure including a plurality of longitudinally spaced transverse walls which define the sides of a plurality of feed troughs in side by side relationship. A guideway extends longitudinally of the wall structure above the feed troughs, and includes a bottom wall having longitudinally spaced discharge openings from the guideway to the feed troughs. Hopper means overlie the guideway and have outlet openings to the guideway in offset relationship to the discharge openings longitudinally of the guideway. An elongated slide includes a pair of laterally spaced side walls and a plurality of transverse partitions that cooperate with the side walls to define longitudinally spaced measuring compartments having open tops and bottoms. The side walls and partitions have lower edges disposed in sliding engagement with the guideway bottom wall for supporting the slide, these edges defining the sole areas of contact between the slide and the bottom wall of the guideway. The open tops of at least some of the compartments are disposed in register with given ones of the hopper outlet openings and the open bottoms of these compartments are disposed out of register with the discharge openings at one limit of movement of the slide, said open tops being out of register with the hopper outlet openings and said open bottoms being are in register with given ones of the discharge openings when the slide is moved the other limit of its movement in the guideway. The compartments and outlet and discharge openings are of such relative size and spacing longitudinally of the guideway that, during movement of the slide between the limits of movement thereof, each compartment is moved out of register with a given discharge opening before it is moved into register with a respective hopper outlet opening.

DESCRIPTION OF THE DRAWINGS

FIG. 1 is a view in perspective of a limited feeder for farm animals produced in accordance with this invention;

FIG. 2 is an enlarged transverse section taken generally on the line 2—2 of FIG. 1;

FIG. 3 is an enlarged longitudinal section taken on the line 3—3 of FIG. 1, some parts being broken away;

FIG. 4 is a view corresponding to FIG. 3 but showing a different position of some of the parts;

FIG. 5, sheet 1, is a fragmentary view partly in plan and partly in section, taken generally on the line 5—5 of FIG. 3;

FIG. 8 is an enlarged view partly in plan and partly in section, taken on the line 8—8 of FIG. 7; and FIG. 9 is an enlarged fragmentary transverse section taken on the line 9—9 of FIG. 7.

DETAILED DESCRIPTION OF THE PREFERRED EMBODIMENT

Figure 6:
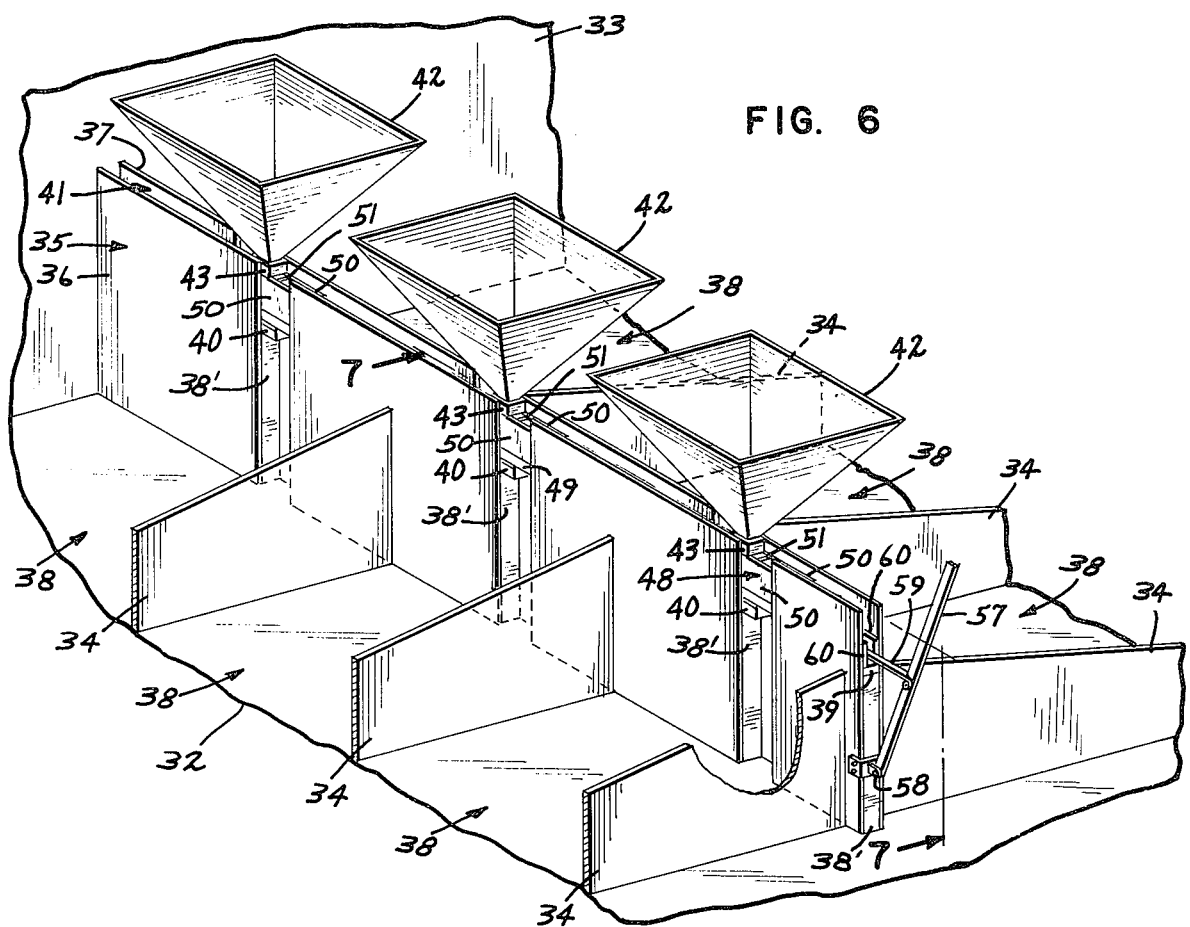
FIG. 6 is a fragmentary perspective showing a modified form of the inventions.

In the form of the invention illustrated in FIGS. 1–5, a feeding apparatus is shown as comprising wall structure including an elongated base wall or floor 1, opposite end walls 2 and 3, a longitudinal intermediate wall 4, and a plurality of longitudinally spaced transverse walls 5. The several walls 1–5 cooperate to define individual feeding bunkers or troughs indicated generally at 6, at opposite sides of the intermediate wall 4, the feed troughs 6 at each side of the intermediate wall 4 being arranged in a row.

An elongated guide structure 7 extends longitudinally of the row of troughs 6 and comprises a pair of laterally spaced side members 8 and a bottom wall 9 that rests on the top edge of the intermediate wall 4 and projects laterally outwardly from opposite sides of the intermediate wall 4, see particularly FIG. 2. The side members 8 and bottom wall 9 are secured at their opposite ends to the end walls 2 and 3, by suitable means, not shown, the bottom wall 9 being rigidly secured to the upper edge of the intermediate wall 4.

A feed supply hopper 10 is defined by portions of the end walls 2, a pair of upwardly diverging hopper side walls 11, and a hopper bottom 12 that is joined at its opposite side edges to the lower edges of the hopper side walls 11. The side members 8 are rigidly secured at their upper edges to the hopper side walls 11, see particularly FIG. 2. The transverse walls 5 extend to the upper edges of the side walls 11, as shown in FIGS. 1 and 2, and are rigidly secured to the side walls 11 and the side members 8 of the guide structure 7. As shown by dotted lines in FIG. 1, a hopper extension 13 may be mounted on the hopper 10 to provide for greater feed capacity, if desired.

The guide structure 7 and hopper bottom wall 12 cooperate to define a longitudinally extending guideway 14 in which is longitudinally slidably mounted an elongated slide or train 15. The slide 15 comprises a pair of laterally spaced generally vertical side walls 16 connected by a plurality of longitudinally spaced vertical partitions 17 and pairs of transverse partitions 18 which converge downwardly toward the vertical partitions and cooperate with said vertical partitions 17 and the side walls 16 to define measuring compartments 19. The lower edges of the converging partitions 18 of each pair thereof are spaced longitudinally of the guideway 14 from the lower edges of the vertical partition 17 between them, so that the compartments 19 are open at their bottoms as well as at their top portions. The bottom wall 9 of the guide structure 7 is covered by a thin sheet 20 of synthetic plastic or other suitable material having a smooth top surface for slidingly supporting the slide 15. Only the lower edges of the side walls 16 and partitions 17 and 18 rest on the top surface of the wear sheet 20, so that there is a minimum of surface area of the slide 15 engaging the sheet 20.

The bottom wall 12 of the hopper 10 is formed to provide a plurality of rectangular outlet openings 21 to the guideway 14, the outlet openings 21 being disposed in longitudinally spaced relationship, as shown in FIGS. 3 and 4. The bottom wall 9 of guideway 14 is formed to provide a pair of end discharge openings 22 in inwardly spaced relation to adjacent end walls 2 and 3, and intermediate discharge openings 23 disposed in longitudinally spaced relation to each other and to the end openings 22. It will be noted that the discharge openings 22 and 23 establish communication between the guideway 14 and the feed troughs 6 on both sides of the intermediate wall 4. With reference to FIGS. 3 and 4, it will be seen that the discharge openings 23 extend longitudinally of the guideway 14 and are so disposed so that each discharge opening 23 establishes communication between the guideway 14 and a pair of adjacent feed troughs 6 at both sides of the intermediate wall 4. With this arrangement, the feed troughs 6 adjacent the end walls 2 and 3 communicate with the guideway 14 through one of the discharge openings 22 and a portion of one of the discharge openings 23, the intermediate feed troughs 6 communicating with the guideway 14 through portions of adjacent intermediate discharge openings 23. It will be further noted, with reference to FIGS. 3 and 4, that the outlet openings 21 are longitudinally offset from the discharge openings 22 and 23, for a purpose which will hereinafter become apparent.

Longitudinal sliding movement is imparted to the slide 15 by means such as an operating handle 24 pivotally secured at its lower end to a bracket 25 mounted on the end wall 3. A bifurcated pitman arm 26 extends through an opening 27 in the end wall 3 and has its outer end pivotally connected to the operating handle 24, as indicated at 28, and its inner end pivotally connected to a bracket 29 on the adjacent end of the slide 15. Longitudinal sliding movement of the slide 15 is limited in one direction by engagement thereof with the end wall 2, and in the opposite direction by suitable means, such as a lip portion 30 of the end wall 3.

With reference to FIG. 3, it will be seen that, in one position of the slide 15, every second compartment 19 is disposed in underlying relationship to one of the hopper outlet openings 21, the bottoms of these compartments 19 being closed by the bottom wall 9. At this time, alternate ones of the compartments 19 have their open bottoms in overlying relationship to one of the end discharge openings 22 and to the discharge openings 23, the arrangement being such that while every second compartment 19 is being filled with feed material from the hopper 10, alternate ones of the compartments 19 are emptying feed material each into different feed trough 6 at opposite sides of the intermediate wall 4. When the operating handle 24 is moved to its position of FIG. 4, the compartments 19 that have been filled from the hopper 10 are disposed with their open lower ends, one over the opposite end opening 22 and the others over portions of the intermediate discharge openings 23, so as to discharge feed material into the troughs 6; while the earlier emptied compartments 19 are disposed in underlying relationship to the hopper outlet openings 21, so as to be filled with feed material therefrom, the bottoms of these compartments overlying the bottom wall 9 out of register with the discharge openings. The distances between the discharge openings 22 and 23, the dimensions thereof and the hopper outlet openings 21 and the offset relationship between the outlet openings 21 and the discharge openings 22 and 23 are such that the open bottom of each compartment 19 moves completely out of registration with a respective discharge opening before the open top of the compartment moves into registration or material receiving relationship with a given hopper outlet opening 21. In like manner, the open top of each compartment 19 moves completely out of register with its respective outlet opening 21 before its open bottom moves into register with a respective underlying discharge opening 22 or 23. It will be noted, with reference to FIGS. 3 and 4, that during movement of the slide 15 from one limit to the other of its movement, each vertical partition 17 moves from one side of a given outlet opening 21 to the opposite side thereof longitudinally of the guideway 14. With the arrangement shown, movement of the slide 15 from one end of the guideway 14 to the other thereof causes equal amounts of material from given ones of the compartments 19 to be delivered to underlying feed troughs 6 at opposite sides of the intermediate wall 4; and, during return movement of the slide 15 to its other limit of movement a second quantity of feed is delivered to each feed trough 6. Thus, the operator may control the amount of feed delivered to each trough 6 by manipulation of the operating handle 24 to move the slide 15 as many times as is necessary for one feeding. For the purpose of mobility, a pair of skids 31 are secured to the bottom surface of the base wall or floor 1.

DESCRIPTION OF THE MODIFIED FORM

In the form of the invention illustrated in FIGS. 6–9, a base wall or floor member 32 and a vertical end wall 33, togethter with a plurality of transverse walls 34 cooperate to support an intermediate longitudinal wall 35 having laterally spaced wall elements 36 and 37, the walls 32–35 cooperating to define opposite feed troughs 38 disposed in side by side relationship to provide a pair of rows thereof. The wall elements 36 and 37 are held in spaced apart relationship by vertical members 38' and horizontal members 39 and 40 at the upper ends of the vertical members 38' and downwardly spaced from the top edges of the wall elements 36 and 37 to defined therewith a longitudinal guideway 41. A plurality of feed hoppers 42 are supported in suitable holding devices 43 carried by the wall elements 36 and 37 at the upper edges thereof, the hoppers 42 having outlet openings 44 to the guideway 41. The horizontal members 39 and 40 are spaced apart longitudinally of the intermediate wall 35 to define longitudinally spaced discharge openings 45 for delivery of feed material from the guideway 41 to opposite ones of the feed troughs 38. Also preferably, and as shown, the top surfaces of the horizontal members 39 and 40 are covered with wear sheets 46 and 47, respectively.

Figure 7:
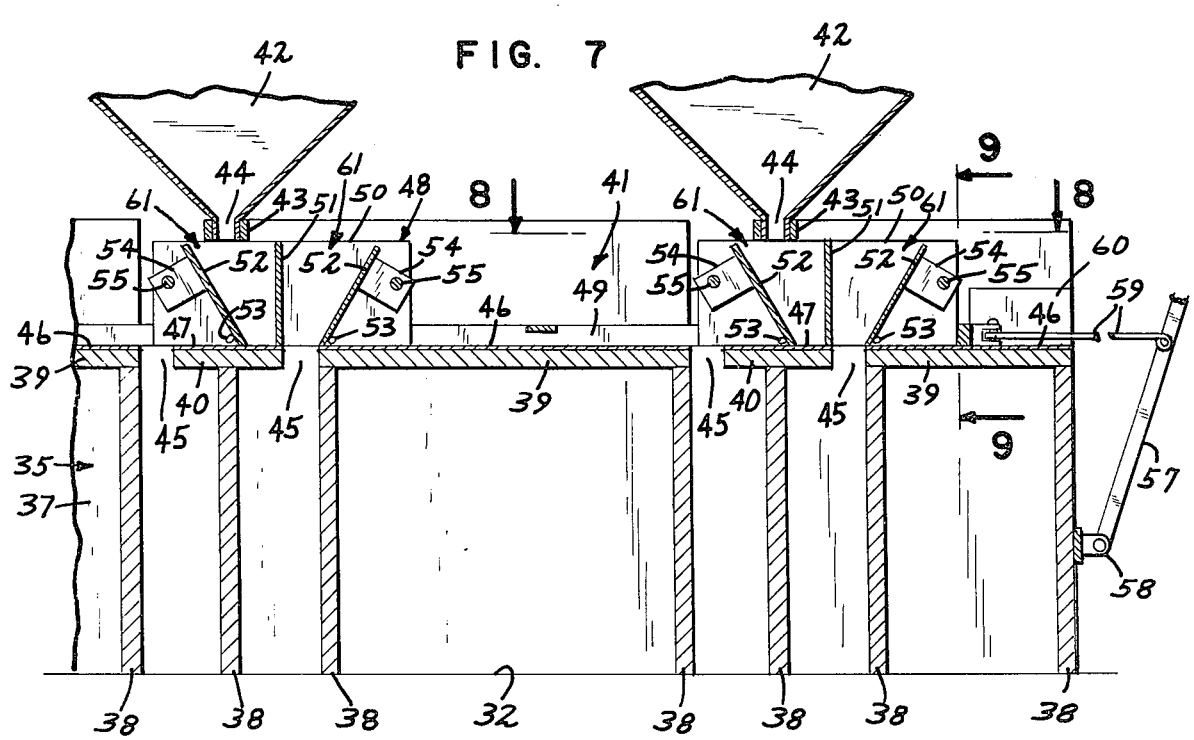
FIG. 7 is an enlarged fragmentary section taken on the line 7—7 of FIG. 6.

The horizontal members 40 are relatively shorter than the members 39 longitudinally of the structure, so as to dispose the discharge openings 45 in pairs of closely spaced openings. With reference particularly to FIG. 7, it will be seen that the hopper outlet openings 44 are each longitudinally offset from the discharge openings 45 of a given pair thereof, the outlet openings 44 directly overlying the longitudinally central portions of respective ones of the horizontal members 40. It will be further noted that the wall elements 36 and 37 are so disposed that the discharge openings 45 of a given pair thereof are disposed to deliver feed into feed troughs 38 on an opposite side of the intermediate wall 35.

A slide 48 is mounted in the guideway 41 for longitudinal sliding movement therein, and comprises a pair of elongated side members or bars 49 having lower edges that slidably rest on the wear sheets 46–47, a plurality of pairs of laterally spaced vertical side plates 50 secured to the bars 49 and extend-in longitudinally thereof, vertical transverse partitions 51 between the side plates 50 and pairs of downwardly converging partitions 52 at opposite sides of respective ones of the vertical partitions 51. At their lower edges, the partitions 52 are pivotally secured to the side plates 50 by pivot pins or the like 53 so that the angle of convergence between pairs of partitions 52 and their respective partition 51 may be changed if desired. Each of the partitions 52 is provided with a generally rectangular adjustment plate 54 having a pin or bolt 55 eccentrically mounted thereon and extending through aligned openings 56 in the side plates 50. By rotating the plates 54 and their pins 55 to dispose different edges of the plates 54 to their respective partitions 52, the partitions 52 may be angularly adjusted about the axes of their respective pivot pins 53.

Longitudinal movement is imparted to the slide 48 and parts carried thereby within the guideway 41 by means of an operating handle 57 pivotally secured at its lower end to a bracket 58 mounted on the intermediate wall 35 and connected to one end of the slide 48 by a pitman arm 59. Movement of the slide 48 is limited by engagement of one end thereof with the end wall 33, and by engagement of the opposite thereof with a pair of stop blocks or plates 60 mounted in the guideway 41. Each partition 51 and its adjacent converging partitions 52 cooperate to define pairs of compartments 61 that operate in the same manner as described above in connection with the compartments 19. In other words, when one compartment 61 is discharging feed material downwardly through its respective opening 45, the other compartment 61 of a given pair is receiving feed material from its respective hopper 42 through the outlet opening 44 thereof. Further, the various portions of the slide 48 have only edge portions slidably engaging the wear sheets 46 and 47 in the same manner as the corresponding portions of the slide 15, above described. With this arrangement, there is small likelihood of any of the portions of either slide 15 or 48 becoming adhered to the respective wear sheets 20, 46 and 47 due to possible freezing of moisture between the relatively moving parts in cold weather.

While I have shown and described a commercial embodiment of the invention, and one modified form thereof, it will be understood that the same is capable of further modification without departure from the spirit and scope of the invention, as defined in the claims.

I claim:

1. In a feeder, in combination:

a hopper having at least one outlet opening in the bottom thereof;

a guideway spaced below said hopper having at least first and second discharge openings in the bottom thereof longitudinally spaced in opposite directions from a location directly below said outlet opening;

a distributor slide mounted for longitudinal movement on the bottom of said guideway in the space between the bottom of said hopper and the bottom of said guideway, and having at least first and second adjacent, longitudinally aligned topless and bottomless measuring compartments defined by longitudinal walls and transverse panel like partitions, said transverse partitions being supported on relatively thin lower edges to minimize the contact area with said guideway in which feed material may accumulate; and means for reversibly removing said slide longitudinally in said guideway between a first position, in which said first compartment is under said outlet opening and said second compartment is over said first discharge opening, and a second position, in which said first compartment is over said second discharge opening, and said second compartment is under said outlet opening, so that at the end of each movement of the slide one of the compartments is being filled from said hopper and the other compartment is emptying;

said outlet and discharge openings and said transverse partitions being so positioned mutually that at no time in the movement of said slide is there a free path from said outlet opening through either one of said measuring compartments; said measuring compartments being disposed completely out of register with their respective outlet and discharge openings during movement of said compartments through an intermediate position between said first and second positions of said slide.

2. The structure of claim 1 in which said guideway includes a wear plate, the bottom edges of said chambers directly engaging said wear plate to support said slide.

3. In a feeder, in combination: a hopper having a row of spaced outlet openings in the bottom thereof;

a guideway spaced below said hopper having sets of first and second discharge openings in the bottom thereof, the openings, in each set being spaced in opposite directions from a location directly below one of said outlet openings;

a distributor slide mounted for longitudinal movement on the bottom of said guideway in the space between the bottom of said hopper and the bottom of said guideway, and having longitudinally aligned sets of first and second adjacent, longitudinally aligned topless and bottomless measuring compartments defined by longitudinal walls and transverse panel like partitions, said transverse partitions being supported on relatively thin lower edges to minimize the contact area with said guideway in which feed material may accumulate;

and means for reversibly moving said slide longitudinally in said guideway between a first position, in which a first compartment is under each outlet opening and a second compartment is over each first discharge opening, and a second position, in which a first compartment is over each second discharge opening, so that at the end of each movement of the slide said first compartments are being filled from said hopper and said second compartments are emptying;

said outlet and discharge openings and said transverse partitions being so positioned mutually that at no time in the movement of said slide is there a free path from any outlet opening through any measuring compartment; said measuring compartments being disposed completely out of register with said outlet and said discharge openings during movement thereof through an intermediate position between said first and second positions of said slide.

4. The structure of claim 3 in which the tops of said compartments are larger than said outlet openings, and the discharge openings of each set are spaced by no less than the range of motion of said slide.

5. The structure of claim 4 in which each of said chambers is defined by a first vertical transverse partition and a second sloping transverse partition, the sloping partitions of adjacent chambers intersecting to define apices transverse to said slide.

* * * * *